Patented Oct. 16, 1923.

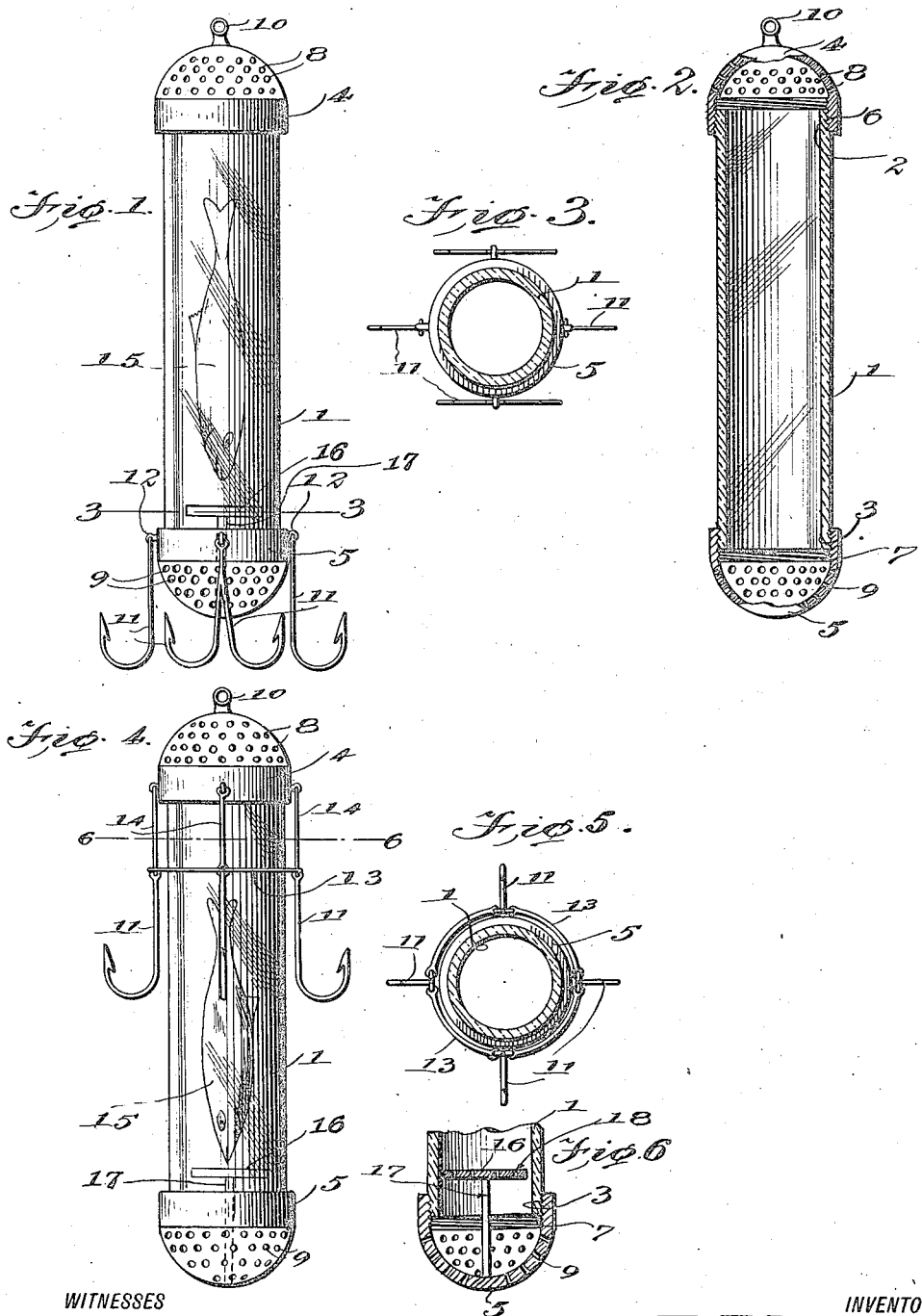

1,470,842

UNITED STATES PATENT OFFICE.

HARRY TAYLOR HYAMS, OF DE KALB, TEXAS.

FISH LURE.

Application filed December 31, 1921. Serial No. 526,239.

*To all whom it may concern:*

Be it known that I, HARRY T. HYAMS, a citizen of the United States, and a resident of the city of De Kalb, in the county of Bowie and State of Texas, have invented certain new and Improved Fish Lures, of which the following is a full, clear, and exact description.

My invention relates generally to fish lures, more particuarly to lures designed to attract the so-ca'led game fish, and it consists in the combination, construction and arrangements, herein described and claimed.

An object of the invention is to effect an economy in the use of bait.

A further object of my invention is to afford facilities for maintaining live bait alive for a considerable length of time while the same is being used to attract game fish.

A still further object of the invention is to provide a lure of simplified construction, which is strong and durable and is thoroughly effective for the purpose intended.

Other objects and advantages will be apparent from the following description, and the novel features of the invention will be particularly outlined in the appended claims.

My invention is illustrated in the accompanying drawings forming a part of this application, in which:

Figure 1 is a side elevation of a practical embodiment of the invention showing a live bait received therein, Figure 2 is a longitndinal section through the body and cap of the form of the device illustrated in Figure 1, the remaining elements thereof being omitted, Figure 3 is a transverse section along the line 3—3 of Figure 1, the disk carried by one of the caps being omitted, Figure 4 is a view similar to Figure 1 of a modified form of the device, Figure 5 is a section on the line 6—6 of Figure 4, the disk carried by one of the caps being omitted and Figure 6 is a fragmental sectional view showing a portion of structure included in the forms of the device illustrated in both Figures 1 and 4.

Referring now to the drawings, in which like reference numerals are used to denote like parts throughout the several views, the numeral 1 designates a cylindrical body made of a transparent material, such as clear crystal glass. The body is made of a material of sufficient gage to afford sufficient durability and strength for the purpose intended while permitting of the provision of a lure which is light enough to be cast or otherwise projected into the water in the usual manner.

The body 1 is provided with external screw threads adjacent to its opposite ends, as indicated at 2 and 3, respectively. Caps 4 and 5 are provided and are screw threaded interiorly adja ent to their ends, as indicated at 6 and 7, respectively, for engagement with the threads 2 and 3 of the body. The caps 4 and 5 may be made of any suitable material, such as aluminum or other light metal, and are fashioned with rounded or convexed end portions having a plurality of perforations formed therethrough, as respectively indicated at 8 and 9. At least one of the caps is provided with a fastening element which in the forms of the device illustrated consists of a ring or eyelet 10 secured to the cap centrally thereof. A line (not shown) may be attached to the eyelet 10 in order that the body 1 may be cast or trolled in the usual manner.

In the embodiment of the invention illustrated in Figures 1 to 3 inclusive, a plurality of hooks 11 have their shanks attached to eye members 12 secured on a ring connected integrally with the cap 5, the eye-members being disposed at spaced intervals to extend radially from the ring. In the form of the device illustrated in Figures 4 and 5, a ring 13 encircling the body 1 at an appreciable distance from the end of the cap 4 is connected with the latter through the agency of a plurality of spaced links 14. The hooks 11 of the form of the device illustrated in Figures 4 and 5 are attached to the ring 13 or to the link 14 at the juncture of the latter with the ring 13, as clearly shown in the drawing.

From the foregoing description of the various parts of the device, the operation thereof may be readily understood. A live bait, such as the minnow 15, is placed within the body 1 and will be confined therein when the caps 4 and 5 are screwed on the opposite ends of the body. Since these caps are perforated, it will be apparent that the water into which the lure is cast may pass freely through the body, whereby the minnow will remain alive for a long time and may be used continuously during extended fishing operations. The transparent body 1 acts as a magnifying medium and at the same time serves to attract the game fish which, upon striking at the confined minnow, are caught by the hooks 11.

As shown in dotted lines in Figs. 1 and 4 and in full lines in Figure 7, the cap 5 has a disk 16 attached thereto by an integral stem 17 also integral with the cap or rigidly secured thereto, whereby the disk 16 extends from the inner wall of the cap beyond the end thereof and is adapted to be disposed within the body 1 when the cap is secured on the latter. The minnow 15 is thereby prevented from entering the portion of the body embraced or hidden by the cap 5. The disk 16 is perforated, as indicated at 18.

The device is simple in construction, can be manufactured cheaply, and is thoroughly practical commercially.

Obviously my improvement is susceptible of embodiment in forms other than those illustrated, and I, therefore, consider as my own all adaptations and modifications of the forms of the device shown which do not depart from the spirit and scope of the invention as disclosed in the foregoing and as outlined in the appended claims.

I claim:

1. A fish lure comprising a longitudinal body made of a transparent material and being open at its opposite ends, caps threadedly engaging the body at its opposite ends and being perforated, one of said caps being formed for connection with a fish line, a ring encircling the body at an appreciable distance from the end of said cap, links connecting the ring with the said cap, and a plurality of hooks carried by the said ring.

2. A fish lure comprising a longitudinal body made of a transparent material and being open at its ends, caps threadedly engaging the body at its ends and being perforated, one of said caps being formed for connection with a fish line, a plurality of hooks attached to the other of said caps, and a perforated disk carried by the last named cap in such manner as to be disposed within the body at a point beyond the end of the cap.

3. A fish lure comprising a longitudinal body made of a transparent material and being open at at least one of its ends, means detachably secured to the body for closing the open end or ends thereof, a ring encircling the body, a plurality of hooks carried by the ring, and means connecting the ring with said closure or with one of said closures.

4. A fish lure comprising a longitudinal body made of a transparent material and being open at at least one of its ends, a closure or closures for the open end or ends of the body, said closure or one of said closures being perforated, a plurality of hooks carried by the body, and a perforated disk carried by said perforated closure in such manner as to be disposed within the body at a point beyond the proximate end of the closure.

HARRY TAYLOR HYAMS.